United States Patent [19]
Joseph

[11] 4,227,029
[45] Oct. 7, 1980

[54] METHOD AND APPARATUS FOR ELIMINATING D.C. IN AN ELECTRIC GLASS MELTING FURNACE

[75] Inventor: James R. Joseph, Brockway, Pa.

[73] Assignee: Brockway Glass Company, Inc., Brockway, Pa.

[21] Appl. No.: 905,586

[22] Filed: May 15, 1978

[51] Int. Cl.² ........................... C03B 5/02; G05F 1/44
[52] U.S. Cl. ........................................ 13/6; 323/18; 323/20; 323/24
[58] Field of Search ............... 13/6, 24; 307/252 A, 307/252 T, 252 UA, 252 W; 323/18, 19, 20, 24; 328/73, 97, 99, 130

[56] References Cited

U.S. PATENT DOCUMENTS

| | | | |
|---|---|---|---|
| 3,290,605 | 12/1966 | Humphrey | 328/97 X |
| 3,546,567 | 12/1970 | Shimp | 323/18 |
| 3,836,689 | 9/1974 | Holler et al. | 13/6 |
| 3,937,921 | 2/1976 | Furuichi et al. | 323/24 X |
| 3,961,236 | 6/1976 | Rodek et al. | 323/18 |

*Primary Examiner*—A. D. Pellinen
*Attorney, Agent, or Firm*—Christel, Bean & Linihan

[57] ABSTRACT

A method and apparatus for controlling the supply of alternating electrical power to the electrodes of an electrical glass melting furnace in a manner eliminating or significantly minimizing any d.c. component. Reverse-poled controlled rectifiers are connected between an a.c. source and the electrodes to provide successive periods of alternating electricity to the electrodes, and the firing or gating of the rectifiers is controlled by a circuit in a manner causing each succeeding period of alternating electricity supplied to the electrodes to begin with a polarity opposite that of the alternating electricity supplied during the immediately preceding period. Any d.c. component will be cancelled to zero when averaged over two adjacent periods.

12 Claims, 8 Drawing Figures

METHOD AND APPARATUS FOR ELIMINATING D.C. IN AN ELECTRIC GLASS MELTING FURNACE

BACKGROUND OF THE INVENTION

This invention relates to the art of glass manufacturing using an electrical furnace, and more particularly to a new and improved method and apparatus for controlling the supply of electricity to such furnaces.

When glass is melted electrically, it is very important that a minimum of direct voltage or current be supplied to the glass furnace. This is because d.c. electricity will cause the glass melting electrodes to exhibit a higher than normal amount of wear and may cause undesirable disturbances such as seeds, blisters and hot spots in the glass. These are some of the reasons why a.c. electricity is used to melt glass.

The a.c. electricity supplied to the glass melting electrodes of a furnace is controlled in accordance with actual and desired operating conditions associated with the melting glass batch and electrodes, and such control is effected by devices such as tapped transformers, saturable core reactors and controlled rectifiers in the electrical power supply circuit for the electrodes. Due to the presence of inductance in such circuits, there will be differences in the areas underneath the voltage and current waveforms of the positive and negative half cycles of the a.c. electricity, and this in turn will give rise to a net d.c. component. It therefore would be highly desirable to provide a method and apparatus for supplying controlled a.c. electricity to such furnaces in a manner eliminating or significantly minimizing any d.c. component.

SUMMARY OF THE INVENTION

It is, therefore, a primary object of this invention to provide a new and improved method and apparatus for controlling the supply of electricity to an electrical glass melting furnace.

It is a more particular object of this invention to provide such a method and apparatus which eliminate or significantly minimize any d.c. component in the electricity supplied to the electrodes of such furnaces.

It is a further object of this invention to provide such a method and apparatus which eliminate or substantially minimize any d.c. component and at the same time permit effective control of the supply of electricity to such electrodes in accordance with actual and desired furnace operating conditions.

It is a further object of this invention to provide such a method and apparatus which are efficient and effective in operation.

The present invention provides a method and apparatus for controlling the supply of alternating electrical power to the electrode means of an electrical glass melting furnace wherein a conductive path is provided by means of an electrical circuit between a supply of alternating electrical power and the electrode means, the electrical conduction of the path is selectively altered by means in the circuit in a manner providing successive periods of alternating electricity to the electrode means, and the selective altering means is controlled in a manner causing each succeeding period of alternating electricity supplied to the electrode means to begin with a polarity opposite that of the alternating electricity supplied during the immediately preceding period. As a result, the polarity of the d.c. component caused by inductance effects and the like will alternate during each successive period thereby eliminating or significantly minimizing the d.c. component. The conduction altering means preferably comprises reverse-poled controlled rectifiers, and the control is provided by a circuit which fires or gates first the rectifier of one polarity and then the one of opposite polarity during one period and then during the next succeeding period firing first the controlled rectifier of polarity opposite the one fired first during the preceding period and then firing the other controlled rectifier.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENT

In basic electrical furnaces for the production of glass, a batch of raw materials is melted in a refractory lined furnace chamber, and typically the electrical furnace will have two or more electrodes submerged in the molten glass which are connected to a source of alternating voltage. The resistivity of the molten glass transfers the electrical energy of the current flowing between the electrodes into heat energy, and the power supplied to the furnace chamber is regulated or controlled by tapped transformers, saturable core reactors or silicon-controlled rectifiers, the latter serving to control the applied voltage.

Figure 1:
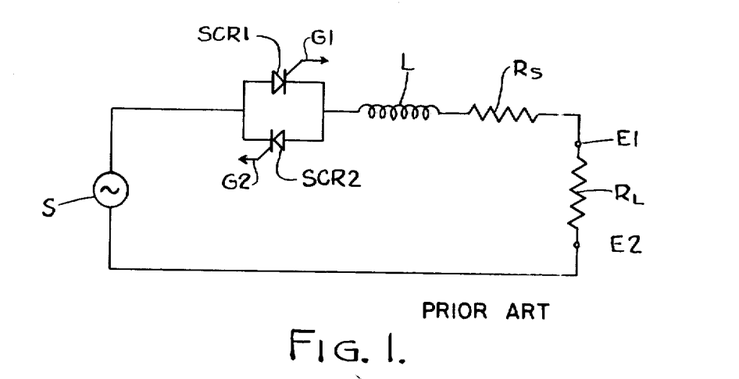
FIG. 1 is a schematic diagram of a basic circuit for supplying alternating electricity to the electrodes of an electrical glass melting furnace.

FIG. 1 shows the equivalent circuit of a typical arrangement for controlling the application of electricity to the glass melting electrodes in a furnace. An a.c. source is designated S and represents a combination of the a.c. line and a conventional transformer, the frequency typically being 60 hertz. The circuit includes the parallel combination of reverse-poled silicon controlled rectifiers SCR1 and SCR2. The combination is connected to one terminal of source S such that rectifiers SCR1 and SCR2 when gated conduct on the positive and negative half cycles, respectively. The inductance L represents the total inductance in the circuit including that of the transformer and cables. The resistance $R_S$ represents the resistance of the transformer, cables and controlled rectifiers. The glass melting electrodes are designated E1 and E2. The resistance $R_L$ between the electrodes represents the resistance of the molten glass therebetween. Thus, the electrodes E1, E2 are connected to the source S under control of the rectifiers SCR1 and SCR2, the circuit also including the series inductance L and resistance $R_S$.

The control or gate terminals G1 and G2 of the silicon-controlled rectifiers SCR1 and SCR2 are connected to firing control circuits whereby the controlled rectifiers may be fired and controlled in a number of different ways. One of these is known as time-proportioning, cycle blocking, whole cycle or zero angle firing, and for purposes of this description it will be designated zero angle firing.

Figure 2:
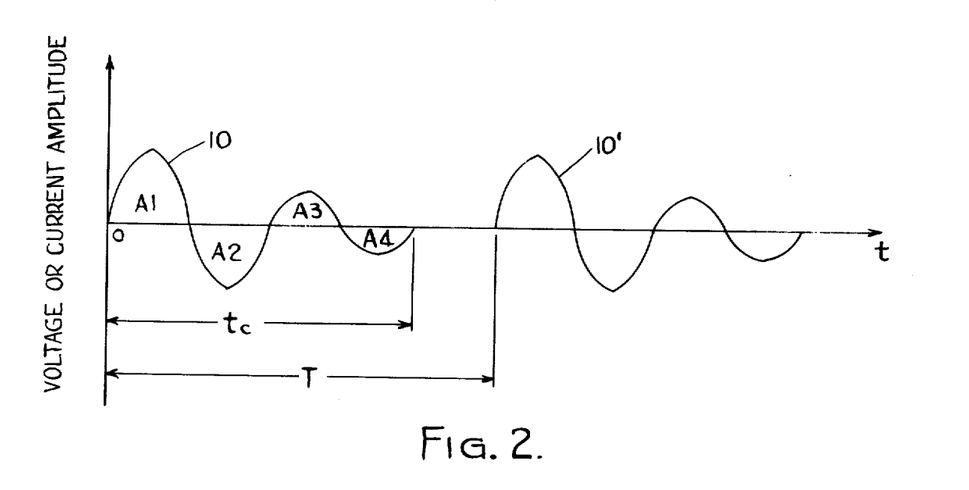
FIG. 2 is a graph of electrical waveforms illustrating the usual operation of the circuit of FIG. 1.

FIG. 2 illustrates the load voltage or load current waveform which results when the controlled rectifiers SCR1 and SCR2 are fired in the zero angle firing mode. The waveforms 10 and 10' occur during adjacent successive time periods, one whole time period being designated T in FIG. 2, and each period T of the a.c. electricity includes a number of positive and negative half cycles during the time of conduction $t_c$ depending upon the rectifier control. The waveform 10 has successive areas A1, A2, A3 and A4 under the curves of the successive half cycles of the waveform. Due to the presence of the inductance L in the circuit, each area is less than the preceding one. In particular the following relationship exists:

$$A1 > A2 \geq A3 \geq A4$$

As a result, there will be a net positive d.c. component which will be repeated during each successive time period T. In particular, and for the circuit shown in FIG. 1, the direct voltage present in the load during one cycle is given by the equation:

$$V_{d.c.} = \frac{VR_L}{WZT}[\cos(WT_1 - \phi) - \cos(-\phi)] - \frac{L^2 WVR_L}{(R_s + R_L)Z^2 T}\left[e^{\frac{-(R_s + R_L)T_1}{L}} - 1\right] \text{ where } Z =$$

$$\sqrt{(R_S + R_L)^2 + (WL)^2} \text{ and } \phi = \tan^{-1}\frac{WL}{RS + RL}$$

and where
L = total inductance in the circuit including transformer and cables
e = 2.7182818
$T_1$ = time of conduction of the controlled rectifiers ($t_c$ in the foregoing discussion)
$R_L$ = resistance of glass between electrodes
T = time of period between start of conduction (the period T in the foregoing discussion)
$R_S$ = resistance of transformer, cables and controlled rectifiers
V = peak voltage of a.c. source S
i = instantaneous current = (V/Z)
$\sin(Wt - \phi) + \frac{WLVe}{Z^2} - Rt/L$
I = average current
$V_{d.c.}$ = average d.c. voltage at the load
f = frequency of source voltage
t = time after start of conduction of controlled rectifiers
$W = 2\pi f$ When glass is melted electrically, it is very important that a minimum of d.c. voltage or current be applied to the glass furnace. Direct voltage or current will cause the glass melting electrodes to exhibit a higher than normal amount of wear and may cause undesirable characteristics such as seeds, blisters and hot spots in the resulting glass product.

Figure 3:
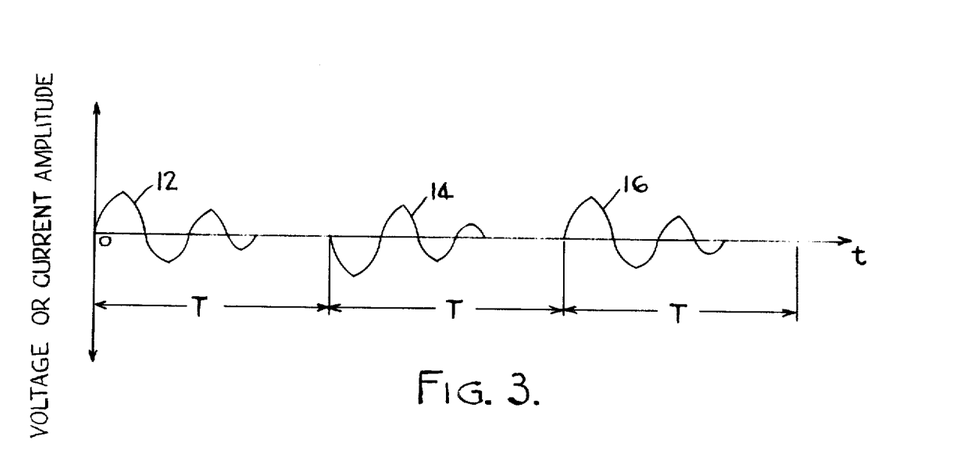
FIG. 3 is a graph of electrical waveforms illustrating the method and apparatus according to the present invention for controlling the supply of alternating electricity to the electrodes of an electrical glass melting furnace.

In accordance with the present invention, d.c. electricity is eliminated or significantly minimized by controlling the firing of the controlled rectifiers in a manner such that each successive period of the electrical waveform begins with a polarity opposite that of the preceding one. As a result, the polarity of the d.c. component caused by inductance effects also will alternate during each successive period with the net result that the d.c. component caused by inductance in the circuit will be cancelled to zero when averaged over two adjacent periods. This is illustrated further in the waveforms of FIG. 3 wherein the waveforms 12, 14 and 16 which occur during successive adjacent periods T are of identical shape having the same area under each curve but wherein waveform 12 begins in a positive-going direction waveform 14 begins in a negative-going direction and waveform 16 begins in a positive-going direction. The net result is that the d.c. component caused by the inductance in the circuit is cancelled to zero when averaged over two adjacent periods. Since the operation of an electric glass melting furnace is a continuous process, the d.c. component will average to zero. Furthermore since the number of positive half cycles equals the number of negative half cycles, no other d.c. voltage or current can be generated. In accordance with the present invention, the foregoing is accomplished in a circuit of the type shown in FIG. 1 by firing during one period first the controlled rectifier of one polarity, i.e. SCR1, and then the controlled rectifier of the opposite polarity, i.e. SCR2, and then during the next succeeding period firing first the controlled rectifier of polarity opposite the one fired first during the preceding period and then firing the other SCR, i.e. by first firing SCR2 and then firing SCR1. Then during the third cycle the firing sequence of the first cycle is repeated and so on. By polarity in referring to the SCRs of course is meant the direction which each SCR is poled or connected for conduction.

Figure 4:
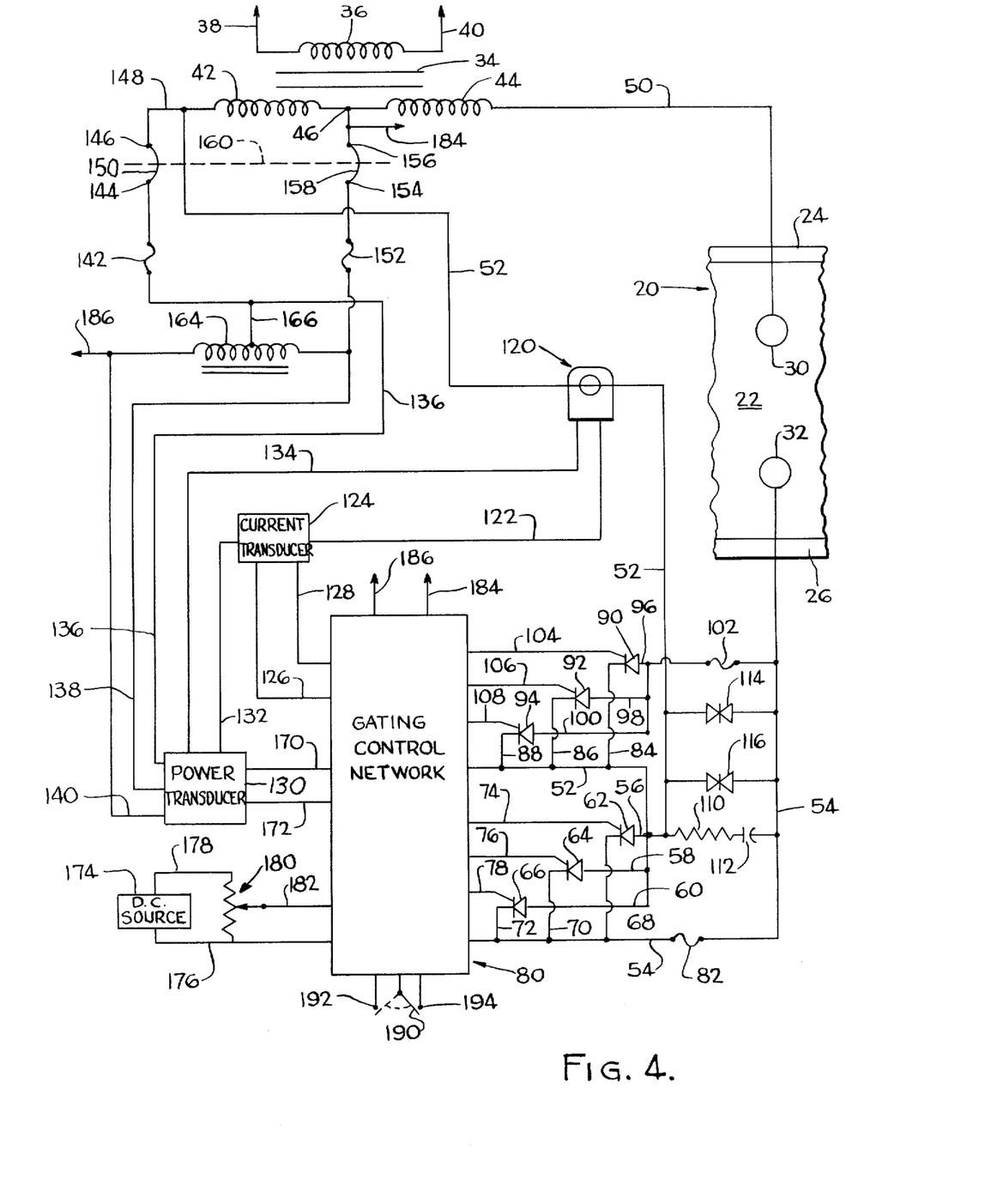
FIG. 4 is a schematic diagram of an electrical circuit according to the present invention for controlling the supply of alternating electricity to the electrodes of an electrical glass melting furnace.

Referring now to FIG. 4, a conventional glass melting furnace 20 includes a furnace chamber or tank defined by a generally horizontal floor 22, a pair of spaced-apart upstanding or vertical sidewalls 24, 26 and a pair of end walls (not shown). The chamber is provided with a batch inlet and a glass outlet all in a known manner. Electrodes 30, 32 extend up through the floor 22 (or sidewalls or endwalls) into the molten glass contained in the furnace chamber. Typically the electrodes are molybdenum rods, and the tops of these electrodes are maintained below the upper surface of the molten glass to prevent erosion from oxidation and abrasion from exposure to air or unmelted batch material. Electrical power is supplied to the electrodes 30, 32 from a transformer generally designated 34 which is connected through the electrical control circuit illustrated in FIG. 4 to the electrodes 30, 32. In particular, transformer 34 includes a primary winding 36 which is connected by lines 38, 40 to a source of a.c. line voltage typically having a magnitude of about 2400 volts. Transformer 34 also includes a pair of secondary winding portions 42, 44 with a center tap point 46 being connected to one terminal of each of the winding portions 42, 44. Electrode 30 is connected by a line 50 to the other terminal of secondary winding portion 44. A line 52 is connected at one end to the other terminal of secondary winding portion 42, and at the other end through a network of controlled rectifiers to a line 54 connected to the other electrode 32.

In particular, line 52 is connected through lines 56, 58 and 60 to the anodes of silicon controlled rectifiers 62, 64 and 66, respectively. The cathodes of controlled rectifiers 62, 64 and 66 are connected by lines 68, 70 and 72, respectively, to line 54. The gate or control electrodes of the rectifiers 62, 64 and 66 are connected by lines 74, 76 and 78, respectively, to a gating control network generally designated 80 which will be described in detail presently. The three silicon controlled rectifiers 62, 64, 66 are provided to give the circuit the necessary current handling capacity since currents 3000 amperes or higher can be encountered in glass furnace operation. A current limiting fuse 82 is connected in line 54 between electrode 32 and the cathodes of the controlled rectifiers. Line 52 also is connected through lines 84, 86 and 88 to the cathodes of silicon controlled rectifiers 90, 92 and 94, respectively. The anodes of controlled rectifiers 90, 92 and 94 are connected by lines 96, 98 and 100, respectively, and through a protective fuse 102 to the line 54. The control or gate terminals of the silicon controlled rectifiers 90, 92 and 94 are connected by lines 104, 106 and 108, respectively, to the gating control network 80. The series combination of a resistor 110 and capacitor 112 is connected between the lines 52, 54 to provide (dV/dt) suppression, i.e. to slow down the rise time of voltage transients. A pair of transient voltage suppression devices 114 and 116 are each connected across lines 52, 54 to limit the peak voltage of transients.

The circuit of FIG. 4 also includes a current transformer generally designated 120 operatively connected to line 52 in a known manner. The current transformer 120 has a pair of output lines, one designated 122 being connected to the input of a current transducer 124 which functions to provide a direct voltage output which is proportional to or indicative of the magnitude of a.c. current flowing in line 52. The d.c. output of current transducer 124 is connected by lines 126, 128 to inputs of the gating control network 80.

The circuit of FIG. 4 further includes a power transducer 130 which functions to convert alternating current and voltage inputs into a d.c. output indicative of the electrical power being consumed. In particular, one current input to power transducer 130 is derived from a line 132 connected to the current transducer 124, and another current input is derived from a line 134 connected to the other output of the current transformer 120. Voltage inputs to power transducer 130 are provided by the three lines 136, 138 and 140 shown in FIG. 4. Line 136 is connected through a protective fuse 142 to a first switch contact 144, and a second switch contact 146 is connected by a line 148 to the junction of line 52 and the terminal of transformer secondary winding portion 42. Contacts 144, 146 are normally closed by a circuit breaker switch arm 150. Line 138 similarly is connected through a protective fuse 152 to a first switch contact 154, and a second switch contact 156 is connected to the secondary winding center tap 46. Contacts 154, 156 normally are closed by a circuit breaker switch arm 158. The switch arms 150, 158 are operated simultaneously mechanically by means of an operator element designated by the broken line 160. Line 140 is connected to one terminal of a winding 164, the other terminal of which is connected to line 138. Winding 164 is provided with at least one tap point intermediate the ends thereof which is connected by a line 166 to the line 136. The direct voltage output from power transducer 130 is connected by lines 170, 172 to inputs of the gating control network 80.

The circuit of FIG. 4 further comprises a reference for control purposes in the form of a d.c. voltage source 174 having a pair of output lines 176, 178. Line 176 is connected to an input of the gating control network 80. A potentiometer 180 is connected across the lines 176, 178, and the wiper arm of the potentiometer is connected by a line 182 to another input of the gating control network 80. The center tap 46 of the transformer secondary winding is connected by a line 184 to the gating control network 80, and another line 186 connects the terminal of winding 64 connected to line 140 to another terminal of the gating control network 80. The gating control network 80 also includes a switch arm 190 movable between a pair of switch contacts 192, 194 for selecting the modes of operation of the network in a manner which will be described.

By way of example, in an illustrative circuit the peak a.c. voltage from secondary winding portions 42, 44 is in the neighborhood of 200 volts, the current transformer 120 has a current capability of about 3000 amperes, current transducer 124 is a commercially available Westinghouse Thermocouple, power transducer 130 is commercially available under the designation Bell #P.S.-2102PX, each fuse 82 and 102 is rated at about 2500 amperes, resistor 110 has a magnitude of about 5 ohms and is rated at about 5 watts, capacitor 112 has a magnitude of about 1 microfarad. The transient voltage suppression devices 114 and 116 are commercially available under the designations VP 250A2D and GE 62525 5A829, respectively. The d.c. source 174 provides an output of about 40 volts and potentiometer 180 has a maximum resistance of about 1 kilohm. The voltage on line 186 is about 120 volts.

Figure 5:
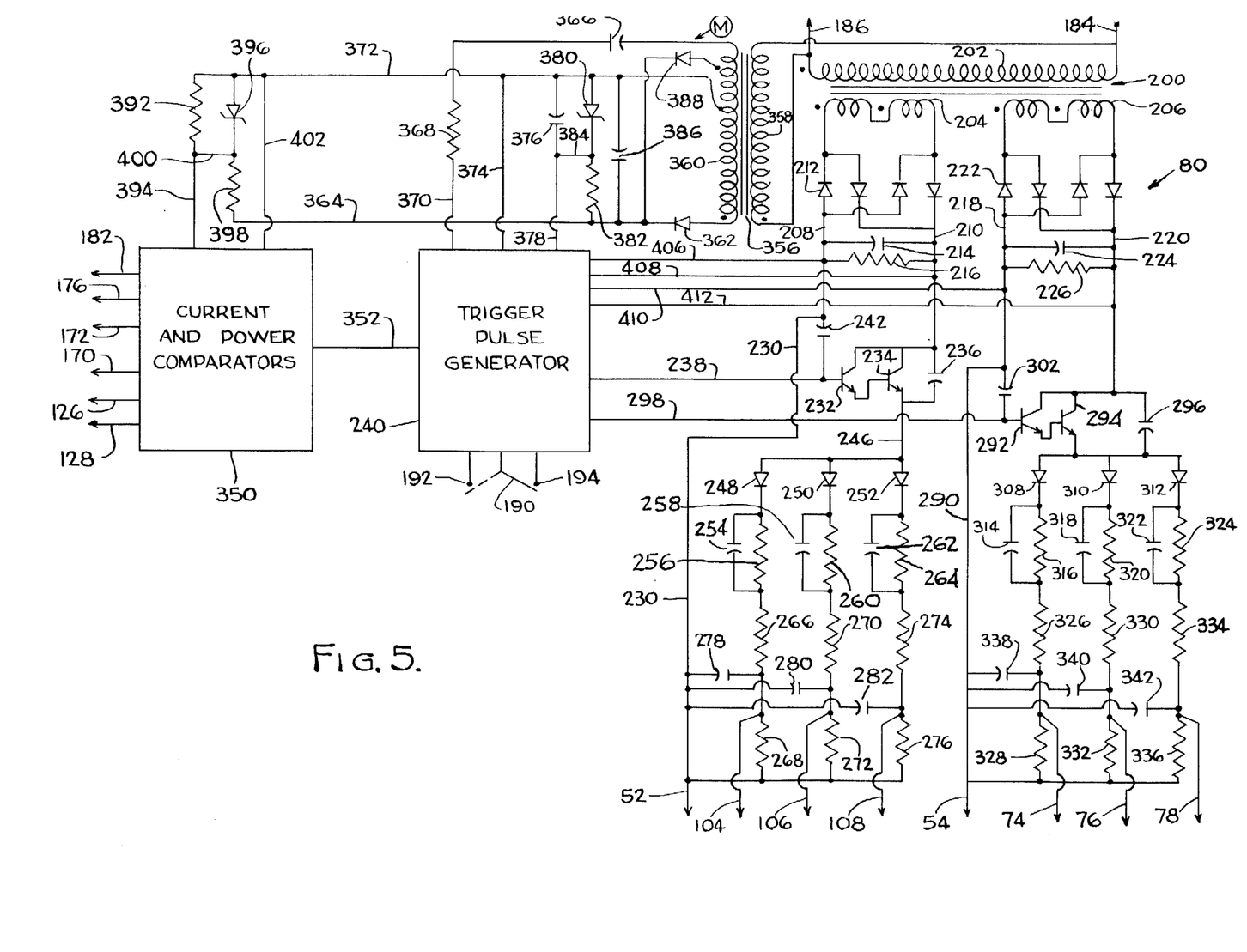
FIG. 5 is a schematic circuit diagram of the gating control network of the circuit of FIG. 4.

The gating control network 80 of the system of FIG. 4 is illustrated in FIG. 5 and includes a transformer 200 having a primary winding 202 which is connected by lines 184 and 186 as shown in FIG. 4 to the secondary center tap of transformer 34 and to the terminal of winding 164, respectively. Transformer 200 includes a pair of secondary winding sections 204 and 206 each having a full wave rectifier and filter network connected thereacross. In particular, opposite end terminals of winding portion 204 are connected to lines 208 and 210, a full-wave diode rectifier generally designated 212 is connected across lines 208, 210, and a filter comprising the parallel combination of capacitor 214 and resistor 216 is connected across lines 208, 210. Similarly, opposite terminals of secondary winding portion 206 are connected to lines 218 and 220, a full-wave diode bridge rectifier generally designated 222 is connected across lines 218, 220, and a filter comprising the parallel combination of capacitor 224 and resistor 226 is connected across lines 218, 220. The dots adjacent the primary and secondary windings of transformer 200 indicate the phase relations according to standard conventions, and the voltages at the left-hand ends of primary winding 202 and secondary winding portion 204 as viewed in FIG. 5 are the same phase.

The rectified and filtered output voltage from each secondary winding portion 204, 206 is connected to the cathodes of a corresponding one of the sets of the silicon-controlled rectifiers and also is connected through a power switch and a gate pulse producing network to the control or gate terminals of the silicon controlled rectifiers of the corresponding set. In particular, with respect to transformer winding portion 204 line 208 is connected by a line 230 to line 52 in the system of FIG. 4 which is connected by lines 84, 86 and 88 to the cathodes of the silicon controlled rectifiers 90, 92 and 94, respectively. Line 210 is connected through a transistor power switch to the gate pulse producing network which, in turn, is connected to the silicon controlled rectifier gate terminals. The transistor power switch comprises a pair of NPN transistors 232, 234 wherein the base terminal of transistor 232 is the switch control terminal, the emitter terminal of transistor 232 is connected to the base terminal of transistor 234, and the collector terminals of the transistors are connected together and to line 210. A capacitor 236 is connected across the collector and emitter terminals of transistor 234. The base terminal of transistor 232 is connected by a line 238 to an output of a trigger pulse generator 240 which will be described presently. The base terminal of transistor 232 also is connected to one terminal of a capacitor 242, the terminal of which is connected to the junction of lines 208 and 230. In response to a pulse of sufficient magnitude or amplitude applied to the base terminal of transistor 232 the switch turns on to connect line 210 through the collector-emitter path of transistor 234 to the input of a gate pulse producing network which now will be described.

The emitter of transistor 234 is connected by a line 246 to the anodes of three diodes 248, 250 and 252. The cathode of diode 248 is connected to one side of the parallel combination of a capacitor 254 and resistor 256, the cathode of diode 250 is connected to one side of the parallel combination of a capacitor 258 and a resistor 260, and the cathode of diode 252 is connected to one side of the parallel combination of a capacitor 262 and resistor 264. The other side of the capacitor 254 and resistor 256 combination is connected through the series combination of resistors 266, 268 to line 230, the capacitor 258 and resistor 260 combination is connected through the series combination of resistors 270, 272 to line 230, and the capacitor 262 and resistor 264 combination is connected through the series combination of resistors 274, 276 to line 230. The junction of resistors 266, 268 is connected to line 104 which, as shown in FIG. 4, is connected to the control or gate terminal of silicon controlled rectifier 90. The junction of resistors 270, 272 is connected to line 106 which, in turn, is connected to the control or gate terminal of silicon controlled rectifier 92. Likewise, the junction of resistors 274, 276 is connected to line 108 which, in turn, is connected to the control or gate terminal of silicon controlled rectifier 94. Line 230 is connected by capacitors 278, 280 and 282 to the junctions of resistors 266, 268, resistors 270, 272 and resistors 274, 276, respectively.

In a similar manner, line 218 from transformer winding portion 206 is connected by a line 290 to line 54 which, as shown in FIG. 4, is connected by lines 68, 70 and 72 to the cathodes of silicon controlled rectifiers 62, 64 and 66, respectively. Line 220 is connected to a transistor power switch including NPN transistors 292, 294 which is identical to the switch including transistors 232, 234, and a capacitor 296 is connected across the collector-emitter path of transistor 294. The control or base terminal of transistor 292 is connected by a line 298 to another output of the trigger pulse generator 240, and the base terminal of transistor 292 also is connected to one terminal of a capacitor 302, the other terminal of which is connected to the junction of lines 218 and 290. The emitter of transistor 294 is connected in a manner similar to that of transistor 234 a gating pulse producing network, in particular to each of three parallel circuit branches identical to those previously described and containing the components as identified in FIG. 5. The junctions of resistors 326, 328, 330, 332 and 334, 336 are connected by lines 74, 76 and 78, respectively, to the control or gate terminals of the silicon controlled rectifiers 62, 64 and 66, respectively as shown in FIG. 4.

The gating control network 80 shown in FIG. 5 further includes an arrangement of current and power comparator circuits generally designated 350 for comparing the instantaneous electrical power and current delivered to the furnace electrodes 30, 32 each with desired reference values for controlling the supply of additional current and power to the electrodes. Inputs to the comparators 350 are obtained from lines 126, 128, 170, 172, 176 and 182 from the circuit of FIG. 4 in a manner which will be described. An output from the comparator circuits 350 is connected by a line 352 to a control input of the trigger pulse generator 240. Voltages for operating the trigger pulse generator 240 and comparators 350 are derived from a transformer 356 having a primary winding 358 connected to lines 184, 186. Transformer 356 has a secondary winding 360, one end of which is connected to the anode of a diode 362, the cathode of which is connected to a line 364. The other end of winding 360 is connected to one terminal of a capacitor 366, the other terminal of which is connected through a resistor 368 to a line 370 connected to one point in the circuit of pulse generator 240. A line 372 is connected to an intermediate tap on secondary winding 360 and line 372 is connected by a line 374 to another point in the circuit of pulse generator 240. Line 372 also is connected to one terminal of a capacitor 376, the other terminal of which is connected by a line 378 to another point in the circuit of the pulse generator 240. Line 372 also is connected to the anode of a Zener diode 380, the cathode of which is connected through a resistor 382 to line 364 and also is connected by a line 384 to line 378. A capacitor 386 is connected across lines 364, 372 and a diode 388 is connected as shown in FIG. 5 from a tap on secondary winding 360 to the line 364.

Line 372 is connected also to one terminal of a resistor 392, the other terminal of which is connected by a line 394 to one point in the comparator circuits 350. Line 372 also is connected to the anode of a Zener diode 396, the cathode of which is connected through a resistor 398 to line 364 and through a line 400 to the line 394. A line 402 connects line 372 to another point in the comparator circuits 350. Various points in the circuit of the trigger pulse generator 240 are connected by lines 406, 408, 410 and 412 to lines 208, 210, 218 and 220, respectively, for purposes to be described.

By way of example, in an illustrative circuit each secondary winding portion 204, 206 of transformer 200 has an a.c. voltage of about 18 volts thereacross, each capacitor 214 and 224 has a magnitude of about 1100 microfarads and is rated at 50 volts d.c., each resistor 216 and 226 has a magnitude of about 33 kilohms, each transistor switch combination 232, 234 and 292, 294 is available commercially under the designation MJE 1103, each capacitor 236 and 296 has a magnitude of about 0.02 microfarads and each capacitor 242 and 302 has a magnitude of about 0.005 microfarads. Each of the capacitors 254, 258, 262, 314, 318 and 322 has a magnitude of about 1.5 microfarads and is rated at 200 volts d.c., each resistor 256, 260, 264, 316, 320 and 324 has a magnitude of about 24 ohms and is rated at 11 watts, each resistor 266, 270, 274, 326, 330 and 334 has a magnitude of about 10 ohms and is rated at 11 watts, each resistor 268, 272, 276, 328, 332 and 336 has a magnitude of about 47 ohms and is rated at about 0.5 watt, and each capacitor 278, 280, 282, 338, 340 and 342 has a magnitude of about 0.001 microfarad. Capacitor 366 has a magnitude of about 1 microfarad and is rated at 200 volts d.c., resistor 368 has a magnitude of about 4.7 kilohms, capacitor 376 has a magnitude of about 50 microfarads and is rated at 15 volts d.c., resistor 382 has a magnitude of about 47 ohms and is rated at 5 watts, capacitor 386 has a magnitude of about 500 microfarads and is rated at 25 volts d.c., Zener diodes 380 and 396 both are of the type commercially designated 1 N 5342B, resistor 392 has a magnitude of about 1 kilohm, and resistor 398 has a magnitude of about 100 ohms and is rated at about 1 watt.

Figure 6:
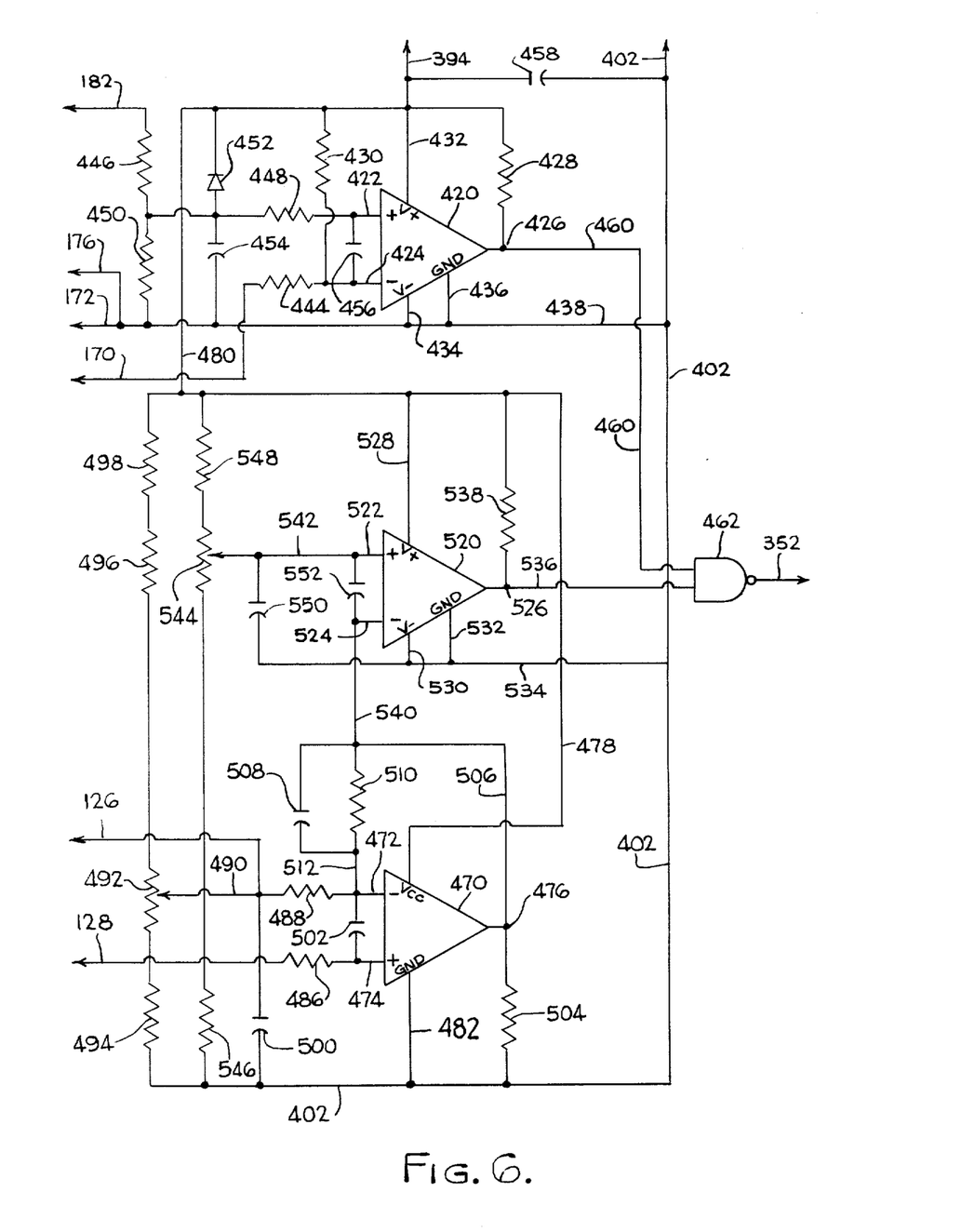
FIG. 6 is a schematic circuit diagram of the current and power comparators in the circuit of FIG. 5.

The current and power comparators circuit 350 is shown in detail in FIG. 6 and includes a power comparator portion comprising a high gain differential amplifier 420 having positive and negative input terminals 422 and 424, respectively, and an output terminal 426. The output terminal is connected through first and second resistors 428 and 430, respectively, to the negative input terminal 424. The junction of resistors 428, 430 is connected to line 394 from the circuit of FIG. 5 and the junction also is connected by a line 432 to the positive supply voltage terminal of amplifier 420. The negative supply voltage terminal and ground terminals of amplifier 420 are connected by lines 434 and 436, respectively, to a line 438 which, in turn, is connected to the line 402 from the circuit of FIG. 5.

Line 170 from the power transducer 130 in the circuit of FIG. 4 is connected through a resistor 444 to the negative input terminal 424 of amplifier 420. Line 172 from the power transducer is connected to line 438 in the circuit of FIG. 6. Line 182 from the wiper arm of the reference potentiometer 180 in the circuit of FIG. 4 is connected through a first resistor 446 and a second resistor 448 to the positive input terminal 422 of amplifier 420. A third resistor 450 is connected from the junction of resistors 446, 448 to line 438 and also to line 176 in the circuit of FIG. 4. A protective diode 452 is connected between the junction of resistors 446, 448 and line 394, a capacitor 454 is connected between the junction of resistors 446, 448 and line 438, and another capacitor 456 is connected across the positive and negative input terminals of amplifier 420. A capacitor 458 also is connected across the lines 394 and 402.

The output of amplifier 420 is connected by a line 460 to one input terminal of a NAND gate 462. A direct voltage on line 170 from the power transducer 130 has a level or amplitude indicative of the actual electrical power being delivered to the furnace electrodes 30, 32. This direct voltage is applied to the negative input terminal 424 of amplifier 420. A direct voltage on line 182 from the wiper arm of the reference potentiometer 180 has a level or amplitude indicative of the desired or predetermined electrical power to be supplied to electrodes 30, 32. This direct voltage is applied to the positive input terminal 422 of amplifier 420. The amplifier and circuitry are arranged or connected such that when the voltage on terminal 424 exceeds the voltage on terminal 422, i.e. the actual power supplied to electrodes 30, 32 exceeds the reference or desired power, the amplifier output 426 goes to a low level. This low voltage level corresponds to a logical zero which is applied by line 460 to one input of NAND gate 462. Irregardless of the level of the other input to NAND gate 462, the logical zero causes the NAND gate output to be a logical one signal which is transmitted by line 352 to the trigger pulse generator 240 which functions in response to this signal to prevent firing of the controlled rectifiers in a manner which will be described. On the other hand, as long as the actual power is less than the desired or reference power, the output of amplifier 420 will be a high or logical one voltage level which is applied to the one input of NAND gate 462. If then the other input to gate 462 is a logical one, a logical zero signal is transmitted by line 352 to trigger pulse generator 240 which then fires the controlled rectifiers in a manner which will be described.

By way of example, in an illustrative circuit, the voltage on line 394 is about 6.8 volts d.c., amplifier 420 is type LM 311D, resistors 428 and 430 have magnitudes of about 10 kilohms and 301 kilohms, respectively, resistors 444, 446, 448 and 450 have magnitudes of 22 kilohms, 100 kilohms, 22 kilohms, and 10 kilohms, respectively, capacitor 454 has a magnitude of about 10 microfarads and is rated at 10 volts d.c., capacitor 456 has a magnitude of about 0.001 microfarads and capacitor 458 has a magnitude of about 0.1 microfarads and is rated at 12 volts d.c.

The current monitoring portion of the circuit of FIG. 6 includes a first differential amplifier 470 having negative and positive input terminals 472 and 474, respectively, and an output terminal 476. The supply voltage terminal of amplifier 470 is connected by a line 478 and by a line 480 to the line 394 in the circuit of FIG. 5. The ground or reference terminal of amplifier 470 is connected by a line 482 to the line 402 in the circuit of FIG. 5. Line 128 from the current transducer 124 in the circuit of FIG. 4 is connected through a resistor 486 to the positive input terminal 474 of amplifier 470. Line 126 from the current transducer in the circuit of FIG. 4 is connected through a resistor 488 to the negative input terminal 472 of amplifier 470. The junction of line 126 and resistor 488 is connected by a line 490 to the wiper arm of a potentiometer 492. One terminal of potentiometer 492 is connected through a resistor 494 to the line 402. The other terminal of potentiometer 492 is connected through the series combination of resistors 496 and 498 to line 480. A capacitor 500 is connected between the junction of line 126 and resistor 488 to the line 402, and another capacitor 502 is connected across the input terminals 472, 474 of amplifier 470. The output terminal 476 of amplifier 470 is connected through a resistor 504 to line 402, and this output terminal also is connected by a line 506 to one side of the parallel combination of a capacitor 508 and resistor 510. The other side of the combination is connected by a line 512 to the negative terminal 472 of amplifier 470.

The current monitoring portion of the circuit of FIG. 6 further comprises a second high gain differential amplifier 520 having positive and negative input terminals 522 and 524, respectively, and an output terminal 526. The positive supply voltage terminal of amplifier 520 is connected by a line 528 to line 480, and the negative supply terminal and the ground or reference terminal are connected by lines 530 and 532, respectively, to a line 534. Line 534, in turn, is connected to line 402. The output terminal 526 of amplifier 520 is connected by a line 536 to the other input of NAND gate 462, and output terminal 526 also is connected through a resistor 538 to the line 480. The negative input terminal 524 of amplifier 520 is connected by a line 540 to the junction of capacitor 508, resistor 510, and line 506 leading from the output 476 of amplifier 470. The positive input 522 of amplifier 520 is connected by a line 542 to the wiper arm of a potentiometer 544. One terminal of potentiometer 544 is connected through a resistor 546 to line 402, and the other terminal of potentiometer 544 is connected through a resistor 548 to line 480. A capacitor 550 is connected between line 542 and line 534, and another capacitor 552 is connected across the amplifier input terminals 522, 524.

The direct voltage across lines 126, 128 from the current transducer 124 has a level or amplitude, i.e. line 128 measured relative to line 126, which is indicative of the electrical current flowing in the circuit containing furnace electrodes 30, 32. The amplifiers 470, 520 and related circuits are arranged and adjusted so that when the direct voltage indicative of actual current exceeds a reference voltage indicative of desired current, the output 526 of amplifier 520 goes to a low level. In particular, the reference voltage indicative of desired current is established by potentiometer 544. This is accomplished first by shorting the conductors 126, 128 together and adjusting potentiometer 492 until the voltage on output terminal 476 of amplifier 470 reaches a predetermined level. Then potentiometer 544 is adjusted to the desired current limit. If this cannot be reached with potentiometer 544 alone, then the wiper arm of potentiometer 492 is adjusted to decrease or increase the voltage on line 490 relative to line 402 to increase or decrease, respectively, the current limit.

Thus, when the actual current exceeds the desired current, the low level at the output of amplifier 520 corresponds to a logical zero which is applied by line 536 to the other input of NAND gate 462. Irregardless of the level of the other input to NAND gate 462, the logical zero causes the NAND gate output to be a logical one signal which is transmitted by line 352 to the trigger pulse generator 240 which functions in response to this signal to prevent firing of the controlled rectifiers in a manner which will be described. On the other hand, as long as the actual current is less than the desired or reference current, the output of amplifier 520 will be a high or logical one voltage level which is applied to the input of NAND gate 462. If then the other input to gate 462 is a logical one, a logical zero signal is transmitted by line 352 to trigger pulse generator 240 which then fires the controlled rectifiers in a manner which will be described.

By way of example, in an illustrative circuit amplifier 470 is type MC 1741L, the voltage on line 478 is about 6.8 volts d.c., each of the resistors 486 and 488 has a magnitude of about 470 ohms, potentiometer 492 has a maximum resistance of about 1 kilohm, each of the resistors 494 and 496 has a magnitude of about 3.48 kilohms, and resistor 498 has a magnitude of about 1.2 kilohms. Capacitor 500 has a magnitude of about 50 microfarads and is rated at 15 volts d.c., capacitor 502 has a magnitude of about 0.001 microfarads, resistor 504 has a magnitude of about 10 kilohms, capacitor 508 has a magnitude of about 100 microfarads and is rated at 10 volts d.c., and resistor 510 has a magnitude of about 22 kilohms.

Amplifier 520 is type LM 311D, resistor 538 has a magnitude of 22 kilohms, potentiometer 544 has a maximum resistance of 10 kilohms, resistor 546 has a magnitude of about 51 kilohms, resistor 548 has a magnitude of about 47.5 kilohms, capacitor 550 has a magnitude of about 10 microfarads and is rated at 10 volts, and capacitor 552 has a magnitude of about 0.001 microfarads.

In the foregoing illustrative example, the reference voltage on line 542 is set to a level corresponding to a current limit or maximum of 3000 amperes in the circuit containing furnace electrodes 30, 32. This is done by setting potentiometer 544 such that a voltage on line 542 of 3.6 volts d.c. corresponds to the current limit of 3000 amperes. The potentiometer 492 is set with leads 126, 128 shorted as explained before such that the voltage at output terminal 476 of amplifier 470 is 2.9 volts d.c.

Figure 7:
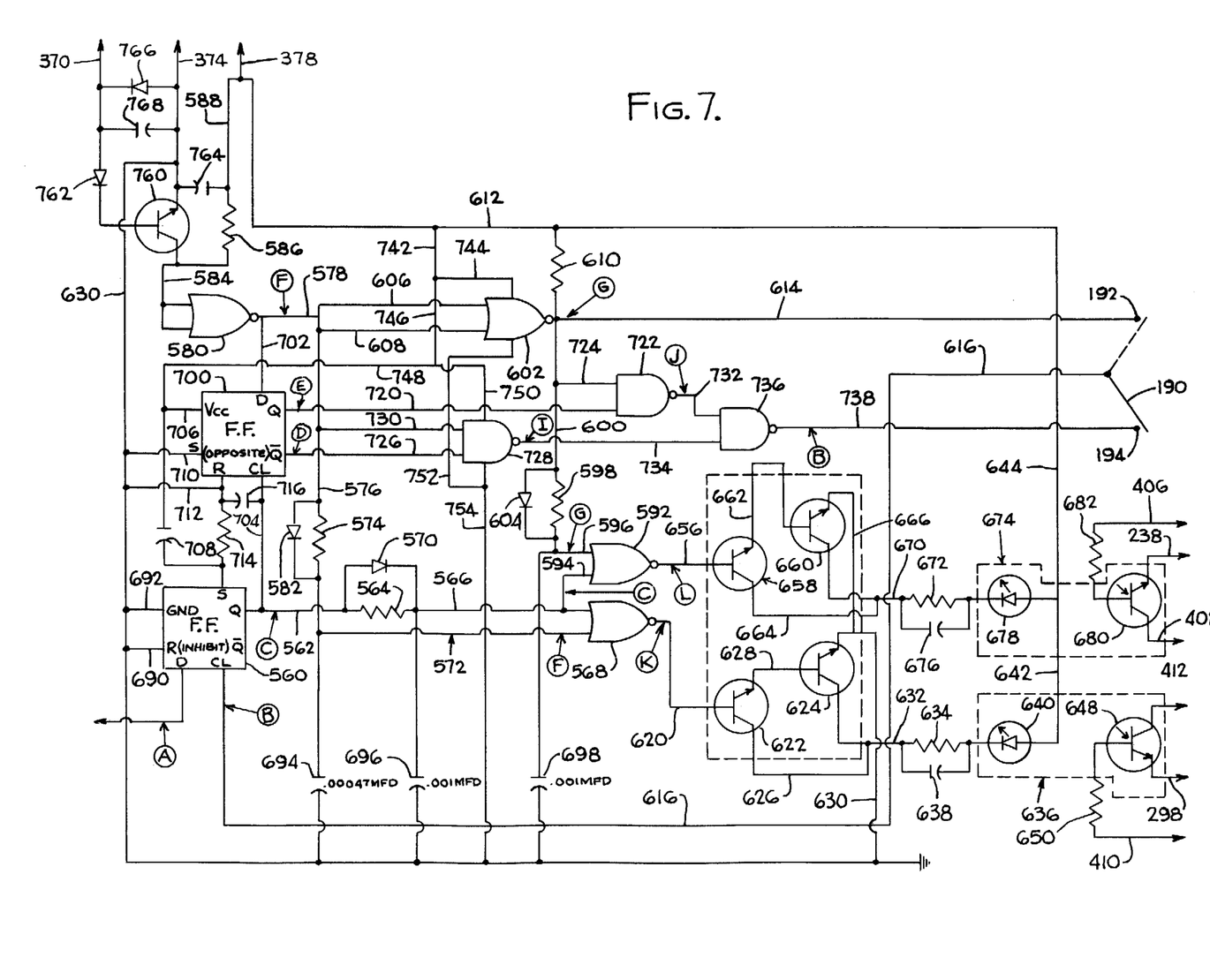
FIG. 7 is a schematic circuit diagram of the trigger pulse generator in the circuit of FIG. 5.

FIG. 7 illustrates in further detail the circuit of the trigger pulse generator 240 shown in FIG. 5. The circuit includes means in the form of a flip-flop 560 for generating an inhibit signal to prevent firing of the silicon controlled rectifiers during a particular cycle. This is done, in turn, when the current and power comparators 350 indicate that the current and/or power delivered to furnace electrodes 30, 32 exceeds a predetermined value as previously described. Line 352 from the output of the comparator circuits 350 is connected to the D input of flip-flop 560. The true or Q output of the flip-flop is connected by a line 562 to one terminal of a resistor 564, the other terminal of which is connected by a line 566 to one input of a NOR gate 568. A timing diode 570 is connected across resistor 564. The $\overline{Q}$ or complement output of flip-flop 560 is not used. The other input of NOR gate 568 is connected by a line 572 to one terminal of a resistor 574, the other terminal of which is connected by lines 576 and 578 to the output of a NOR gate 580. A protective diode 582 is connected across resistor 574. Both inputs of NOR gate 580 are connected by a line 584 to one terminal of a resistor 586, the other terminal of which is connected by a line 588 to line 378 in the circuit of FIG. 5. Pulsed d.c. voltage is present on line 584 as will be described presently and is transmitted through the NOR gate 580 in the form of pulses to the one input of NOR gate 568.

The circuit of FIG. 7 further comprises a second NOR gate 592, and one input thereof is connected by a line 594 to the line 566 leading to the input of NOR gate 568. The other input of NOR gate 592 is connected by a line 596 to one terminal of resistor 598, the other terminal of which is connected by a line 600 to the output of a NOR gate 602. A timing diode 604 is connected across resistor 598. The two inputs of NOR gate 602 are connected by lines 606 and 608, respectively, to line 578 leading from the output of NOR gate 580. The output of NOR gate 602 is connected to one terminal of a resistor 610, the other terminal of which is connected by a line 612 to the line 378 in the circuit of FIG. 5. The output of NOR gate 602 also is connected by a line 614 to the switch contact 192 of the mode control switch which, as shown in FIG. 7, has the switch arm 190 bridging the contact 194. Switch arm 190, in turn, is connected by a line 616 to the clock input terminal of the flip-flop 560.

The outputs of NOR gates 568 and 592 are connected through coupling networks to the lines 298 and 238, respectively, in the circuit of FIG. 5 for delivering trigger pulses to ultimately fire the silicon controlled rectifiers. In particular, the output of NOR gate 568 is connected by a line 620 to the control input of a transistor switch comprising the combination of a first NPN transistor 622 and a second NPN transistor 624. Line 620 is connected to the control or base terminal of transistor 622, the collector of transistor 622 is connected by a line 626 to the collector of transistor 624, and the emitter of transistor 622 is connected by a line 628 to the control or base terminal of transistor 624. The emitter of transistor 624 is connected to a circuit ground or reference line 630 which, in turn, is connected to the line 374 in the circuit of FIG. 5. The collector of transistor 624 is connected to one terminal of a resistor 634, the other terminal of which is connected to the input of a light emitting diode and phototransistor combination generally designated 636 in FIG. 7. A capacitor 638 is connected across resistor 634. The combination 636 includes a light emitting diode 640, the cathode of which is connected to the other terminal of resistor 634 and the anode of which is connected by lines 642 and 644 to line 612 which, in turn, is connected to line 378. The combination 636 further comprises a photoresponsive or transistor 648 operatively associated with the light emitting diode 640. The emitter terminal of the phototransistor 648 is connected to line 298 in the circuit of FIG. 5. The base terminal of phototransistor 648 is connected through a resistor 650 to line 410 in the circuit of FIG. 5, and the collector terminal of phototransistor 648 is connected to line 412 in the circuit of FIG. 5.

In a similar manner, the output of NOR gate 592 is connected by a line 656 to the control input of a transistor switch comprising the combination of a first NPN transistor 658 and a second NPN transistor 660. Line 656 is connected to the control or base terminal of transistor 658, the emitter of transistor 658 is connected by a line 662 to the base of transistor 660, and the collector terminal of transistor 658 is connected by a line 664 to the collector terminal of transistor 660. The emitter terminal of transistor 660 is connected by a line 666 to the reference line 630. The collector terminal of transistor 660 also is connected by a line 670 to one terminal of a resistor 672. The other terminal of resistor 672 is connected to a light emitting diode and phototransistor combination 674. A capacitor 676 is connected across resistor 672. The combination 674 includes a light emitting diode 678, the anode of which is connected to line 644 and the cathode of which is connected to the other terminal of resistor 672. The light emitting diode 678 is operatively associated with a phototransistor 680. The emitter terminal of transistor 680 is connected to line 238 in the circuit of FIG. 5. The base terminal of transistor 680 is connected through a resistor 682 to line 406 in the circuit of FIG. 5, and the collector of phototransistor 680 is connected to line 408 in the circuit of FIG. 5.

The reset and ground or reference terminals of the flip-flop 560 are connected by lines 690 and 692, respectively, to the ground or reference line 630. The junction of line 572 and resistor 574 is connected to one terminal of a capacitor 694, the other terminal of which is connected to line 630. The junction of line 566 and resistor 564 is connected to one terminal of a capacitor 696, the other terminal of which is connected to line 630. The junction of line 596 and resistor 598 is connected to one terminal of a capacitor 698, the other terminal of which is connected to line 630.

The circuit of FIG. 7 further comprises a second flip-flop 700, and the D input terminal of the flip-flop is connected by a line 702 to the output of NOR gate 580.

The clock input terminal of flip-flop 700 is connected by a line 704 to the true or Q output of flip-flop 560. The $V_{cc}$ or reference terminal of flip-flop 700 is connected by a line 706 to one terminal of a capacitor 708, the other terminal of which is connected to the set terminal of flip-flop 560. The set terminal of flip-flop 700 is connected by a line 710 to the circuit reference line 630. The reset terminal of flip-flop 700 is connected by a line 712 to the reference line 630 and also to one terminal of a resistor 714, the other terminal of which is connected to the set terminal of flip-flop 560. The reset terminal of flip-flop 700 also is connected to one terminal of a capacitor 716, the other terminal of which is connected to the clock terminal of the flip-flop 700.

The true or Q output of flip-flop 700 is connected by a line 720 to one input of a NAND gate 722, and the other input terminal of NAND gate 722 is connected by a line 724 to the output of NOR gate 602. The $\overline{Q}$ or complement output of flip-flop 700 is connected by a line 726 to one input of a NAND gate 728, and the other input of NAND gate 728 is connected by a line 730 to line 578 leading from the output of NOR gate 580. The outputs of NAND gates 722 and 728 are connected by lines 732 and 734, respectively, to corresponding inputs of a NAND gate 736. The output of NAND gate 736 is connected by a line 738 to the switch contact 194 of the mode selection switch.

A line 742 leading from line 612 is connected by a line 744 to one bias terminal of NOR gate 602, and line 742 also is connected by lines 746 and 748 to line 706 leading from the $V_{cc}$ terminal of flip-flop 700. The junction of lines 746, 748 is connected by a line 750 to one bias terminal of NAND gate 728. The other bias terminal of NOR gate 602 is connected by a line 752 to the other bias terminal of NAND gate 728. Line 752 also is connected by a line 754 to line 630.

The circuit of FIG. 7 also includes an NPN transistor switch 760, the collector terminal of which is connected to line 584. The base terminal of transistor 760 is connected to the cathode of a rectifying diode 762, the anode of which is connected to line 370. The emitter terminal of transistor 760 is connected to line 374 and also to one terminal of a capacitor 764, the other terminal of which is connected to line 588. The parallel combination of a rectifying diode 766 and smoothing capacitor 768 is connected across lines 370, 374.

Figure 8:
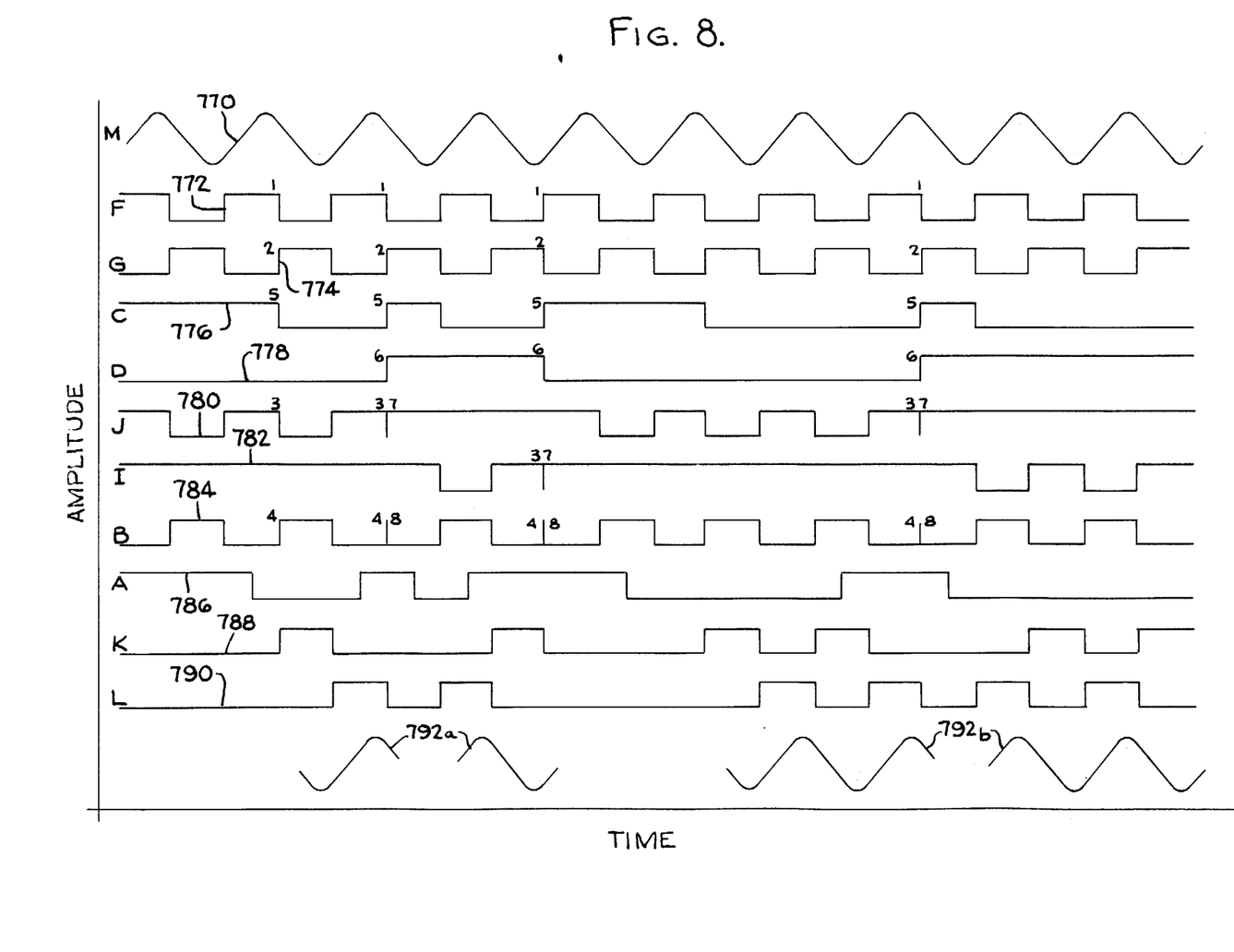
FIG. 8 is a graph of electrical waveforms illustrating the operation of the circuit of FIG. 7.

FIG. 8 includes a number of waveforms which illustrate the operation of the circuit of FIG. 7 with the switch arm 190 in a position engaging contact 194. In this mode of operation the circuit of FIG. 7 functions to gate or fire the silicon controlled rectifiers in a manner causing each succeeding period of alternating electricity supplied to the electrodes to begin with a polarity opposite that of the alternating electricity supplied during the immediately preceding period. The waveforms in FIG. 8 are identified by the letters at the left-hand side of FIG. 8 which letters also indicate in FIGS. 5 and 7 the circuit points at which the waveforms appear. Thus, the waveform 770 is a sine wave obtained at point M shown in FIG. 5 at the end of the transformer secondary winding 360 which is connected to one terminal of the capacitor 366. This waveform reaches the circuit of FIG. 7 through line 370 in a manner which will be described. Waveform 772 is the output of NOR gate 580 which also is designated F in FIG. 7, and waveform 774 of FIG. 8 is obtained at the point G which is at the output of NOR gate 602. Waveform 776 in FIG. 8 is identified by a letter C in the circuit of FIG. 7 at the true or Q output of the flip-flop 560 and which is applied to an input of each of the NOR gates 568 and 592. The waveform 778 is the complement output of flip-flop 700 which is designated D in FIG. 7. The waveform at the true or Q output of flip-flop 700 is designated E in the circuit of FIG. 7 and is the inverse of the waveform D, but this waveform is not shown in FIG. 8 for simplicity of illustration.

The waveform 780 in FIG. 8 is at the location J in FIG. 7 which is the output of NAND gate 722, and waveform 782 is obtained at the location I which is the output of NAND gate 728. The waveform 784 in FIG. 8 appears at point B in the circuit of FIG. 7 which is the output of NAND gate 736, and this waveform is applied to the clock input of flip-flop 560. The waveform 786 in FIG. 8, also designated A, appears on the line 352 and is applied to the D input of flip-flop 560. This waveform is a function of the power or current being demanded by the set point and load conditions, and the pattern shown in FIG. 8 is arbitrary for purposes of demonstration and illustration. The waveform 788 in FIG. 8 is present at the location K at the output of NOR gate 568 in FIG. 7, and the waveform 790 is present at the location L at the output of NOR gate 592. The waveforms 792 in FIG. 8 represent the voltage waveform applied to the furnace electrodes as a result of the operation of the circuit of FIG. 7 corresponding to the waveforms in FIG. 8.

All of the voltage waveforms shown in FIG. 8 are taken with respect to the circuit common or ground. The numbers at some locations above the waveforms indicate the time sequence of change with the changes identified by the lower numbers occurring first.

The sinusoidal voltage waveform 770 at circuit point M is rectified by diodes 762, 766 to provide pulses on the base terminal of transistor 760. Thus when the pulse on the base terminal of transistor 760 goes high, the voltage on the collector goes low, and this low voltage level is applied to both inputs of the NOR gate 580 causing the gate to provide a high or logical one output. Thus, referring to FIG. 8, the pulse voltage waveform 772 is high at locations corresponding to the positive-going portions of the waveforms 770. The output of NOR gate 580 is applied by lines 606, 608 to both inputs of the NOR gate 602 thereby resulting in the waveform 774 at point G. Thus the waveforms 772, 774 have a constant frequency pulse width and pulse interval, all of which are determined by the waveform 770.

The assumed initial conditions of flip-flop 700 are the complement output low, i.e. waveform 778 or D as indicated in FIG. 8, and the true output high, which also is designated E in FIG. 7. The waveforms 778 at point D and 772 at point F are applied to the inputs of the NAND gate 728. The output of the NAND gate 728, waveform 782 at point I, is low only when both of the waveforms 778 and 772 are high as shown in FIG. 8. There is an instantaneous transition from high to low and then returning to high in waveform 782 as shown in FIG. 8 at the point in time corresponding to a drop in the level of waveform D and a simultaneous rise in the waveform at F. The waveform at point E, which is the inverse of that at point D, and the waveform at point G are applied as inputs to the NAND gate 722. The output of the NAND gate 722, i.e. waveform 780 at point J, will be low when both the waveforms E and G are high. There are two instantaneous transitions in the waveform 780 as shown in FIG. 8 each corresponding to simultaneous changes in E from high to low and in G from low to high. These transitions are seen near the middle and at the right-hand portion of FIG. 8. The waveforms I and J, i.e. 782 and 780, are applied as inputs to the NAND gate 736. The output of the gate 736 designated B will be low when both the I and J waveforms are high. There are three instantaneous transitions in this waveform coinciding in time with simultaneous changes in the waveforms I and J.

The waveform at point B is applied to the clock input of the flip-flop 560. The initial condition of the flip-flop 560 is with the true output, i.e. waveform 776 at point C, at a high or logical one level as shown in FIG. 8. The operation of the flip-flop 560 is such that when the clock pulse, i.e. waveform 784 at point B, rises the true output of the flip-flop will go to the logical state previously existing on the D input thereof. The D input, in turn, is the waveform 786 at point A. Thus, proceeding from left to right in FIG. 8, at the first rise in the waveform 784 the level at point A was high prior to the rise in B so that the level at point C, i.e. waveform 776, remains high. At the next rise in waveform B the level at A was low so the level at C falls to zero. The numbers 4 and 5 adjacent the rise and fall of waveforms B and C, respectively, indicates the order or sequence of occurrence as previously explained. The next rise in the clock pulse signal at point B is an instantaneous transition but this nevertheless causes the level at point C to rise because the level at point A had been high prior to the transition. The next rise in B is a regular pulse, and since A had fallen prior to the B pulse the waveform at C likewise falls. By proceeding through a similar analysis further along to the right in FIG. 8, the shape of the C waveform 776 is derived.

With the waveform 776 at point C having been derived as a result of the operation of flip-flop 560 in response to the signals at points B and A, the nature of the waveform 778 at point D and its inverse at point E likewise can be obtained. This is because the waveform at point C from flip-flop 560 also is applied to the clock input of the flip-flop 700. The D input of flip-flop 700 is obtained from point F which is the waveform 772. This flip-flop, however, is connected such that the level at the complement output, i.e. the waveform 778 at point D, will go to whatever logical state previously existed at the D input when a clock pulse rises. The first rise in the clock pulse signal or the waveform 776 at point C occurs about one-quarter of the distance from left to right across FIG. 8, and when this starts to occur the waveform 772 at F had been high prior to the rise in C so the waveform 778 at point D likewise goes to a high level. The inverse waveform at point E will go from high to low. The next rise in the clock pulse to flip-flop 700 represented by waveform 776 occurs when the waveform 772 had been low with the result that the waveform 778 likewise goes to a low level. Similarly, the inverse waveform at point E goes to high level. The next rise in the clock pulse waveform or signal 776 occurs at the right-hand end of FIG. 8. When this starts to occur the waveform 772 had been high thereby causing the waveform 778 to go to a high level. The inverse waveform at point E accordingly goes to a low value.

The waveform 788 at point K is the output of the NOR gate 568 and will be high only when the waveforms 772 and 776 at points F and C, respectively, both are low. Similarly, the waveform 790 at point L at the output of NOR gate 592 will be high only when both of the waveforms 774 and 776 at points G and C, respectively, are low. When the waveform 788 is high the silicon controlled rectifier connected on the negative-going portion of the cycle will fire. When the waveform 790 is high the silicon control rectifier on the positive-going portion of the cycle will fire. Thus the waveforms 792a and 792b in FIG. 8 result.

In particular, as shown in FIG. 8, the positive-going pulses in the waveform 788 result in firing or gating of the silicon-controlled rectifiers 62, 64 and 66 which are poled for conduction on the negative-going portion of the cycle in the circuit including the furnace electrodes 30, 32. Specifically, the positive-going pulse of waveform 788 at point K in the circuit of FIG. 7 turns on the transistor switch comprising the combination of transistors 622, 624 thereby causing conduction of diode 640 which by virtue of the photocoupling turns on transistor 648. The conduction of transistor 648, in turn, turns on the power transistor switch 292, 294 in the circuit of FIG. 5 thereby connecting the rectified d.c. to the resistive-capacitive network to produce gating or firing pulses which appear simultaneously on the lines 74, 76 and 78. The resistive-capacitive network in FIG. 5 produces gating pulses or spikes which have a fast initial rise time which pulses then reach a steady value.

Similarly, the positive-going pulses of waveform 790 result in firing or gating of the silicon-controlled rectifiers 90, 92 and 94 which are connected or poled for conduction on the positive-going portion of the cycle in the circuit including the electrodes 30, 32. In particular, the positive-going pulse of waveform 790 at point L in the circuit of FIG. 7 turns on the transistor switch comprising the combination of transistors 658, 660 thereby causing conduction of the light-emitting diode 678 which through the photocoupling turns on the transistor 680. Conduction of transistor 680, in turn, causes the transistor power switch 232, 234 in FIG. 5 to apply the rectified direct voltage to the resistive-capacitive network in FIG. 5. The network is connected by lines 104, 106 and 108 to the control or gate terminals of the silicon controlled rectifiers 90, 92 and 94, respectively, in FIG. 4. This resistive-capacitive network also produces gating pulses or spikes having a fairly fast initial rise time which pulses then reach a steady value.

As shown in FIG. 8, the period of the voltage or current waveform applied to the furnace electrodes 30, 32 is determined by the waveform 786 at point A in the circuit of FIG. 7. In particular, the circuit operates to gate or fire the silicon-controlled rectifiers only in response to the waveform 786 being at a low or logical zero level. It will be recalled that this, in turn, corresponds to an indication from the current and power comparator circuits that both the instantaneous current flowing to the electrodes 30, 32 and the power being delivered to the electrodes are below the desired or reference values for those quantities. Furthermore, the period of the applied voltage or current is dependent upon the length of time that the waveform 786 is at the low or logical zero level. As illustrated in FIG. 8, the waveforms 792a represent two adjacent periods wherein each period includes one negative-going half cycle and one positive-going half cycle. This corresponds to the low or logical zero portions of waveform 786 at the left-hand part of the waveform in FIG. 8. The waveforms 792b in FIG. 8 are of relatively longer period. In particular, two adjacent periods are shown, each having two negative-going half cycles and two positive-going half cycles within the period. This corresponds to the relatively longer time durations of low or logical zero level portions of waveform 786 illustrated at the right-hand portion of FIG. 8.

As shown in FIG. 8, the two adjacent periods of each of the waveforms 792a, 792b have the relationship that the later-occuring period begins with a polarity opposite that of the immediately preceding period. In particular, referring to the waveforms 792a the first period of the waveform begins in a negative-going direction and the second period of the waveform begins in a positive-going direction. Each period includes the same number of half cycles. Therefore, any direct voltage component is averaged to zero over these two adjacent time periods. Similarly, referring to the waveforms 792b at the right-hand portion of FIG. 8, the first period begins with a negative-going half cycle and it includes two negative-going half cycles and two positive-going half cycles. The next period begins with a positive-going half cycle and it includes two positive-going half cycles and to negative-going half cycles. Accordingly, any direct voltage component is averaged to zero over these two adjacent time periods.

The foregoing is controlled by the time relationship between the voltage waveforms 788 and 790. In the example illustrated in FIG. 8 proceeding from left to right, a positive-going pulse of waveform 788 occurs in time prior to a positive pulse of waveform 790, and this requires that during the next adjacent time period of rectifier conduction the waveform 790 has a positive-going pulse preceding in time the positive-going pulse of the waveform 788. Similarly, further along toward the right-hand portion of FIG. 8, the waveform 788 has two adjacent positive-going pulses and the waveform 790 likewise has two adjacent positive-going portions, with the first pulse of the waveform 788 occurring in time prior to the first pulse of waveform 790. This then requires that in the next adjacent time period of rectifier that the waveform 790 including two positive-going portions will begin in time prior to the waveform 788 including the two positive-going portions, as illustrated in FIG. 8.

The relationship between the waveforms 788 and 790, in turn, is controlled by the waveform 776 at point C in the circuit of FIG. 7 which, in turn, is controlled as a function of the waveform 784 at point B in the circuit and of course also the waveform 786 at point A. As previously described, the waveform A in turn is solely a function of the desired or commanded conduction of the rectifiers as determined by the monitoring operation performed by comparator circuits 350. The waveform 788 at point K is the NOR function or combination of the waveform C and the synchronizing waveform F derived ultimately from the power supply circuit. Similarly, the waveform 790 at point L is the NOR logic function or combination of the waveform C and the synchronizing waveform G which is the inverse of waveform F. The waveform C is controlled partially by the waveform B which is derived from the portion of the circuit of FIG. 7 including flip-flop 700 and the NAND gates 722, 728 and 736 along with the synchronizing waveforms F and G. This portion of the circuit in effect remembers what the waveforms K and L were previously and causes the subsequent waveforms to have the relationship as shown in FIG. 8.

In the circuit of FIG. 7, the combination of transistors 622,624, light emitting diode 640 with photo transistor 648, transistor switch 292, 294, in FIG. 5, and the gating pulse producing network of FIG. 5 between transformer secondary winding portion 206 and lines 74, 76 and 78 may be viewed as first pulse generating means for supplying command pulses to the conduction altering means or controlled rectifiers 62, 64 and 66 for causing electrical conduction of one polarity in the path between the supply 34 and electrodes 30, 32 in FIG. 4. Similarly, the combination of transistors 658, 660, light-emitting diode 678 with photo transistor 680, transistor switch 232,234 in FIG. 5, and the gating pulse producing network of FIG. 5 between transformer secondary winding portion 204 and lines 104, 106 and 108 may be viewed as second pulse generating means for supplying command pulses to the conduction altering means or controlled rectifiers 90, 92 and 94 for causing electrical conduction of an opposite polarity in the path between supply 34 and electrodes 30, 32 in FIG. 4. The remainder of the circuit in FIG. 7 may be viewed as conduction mode control means for controlling the operation of the first and second pulse generating means in an alternating manner from period to period whereby whichever of the pulse generating was the first to operate during the immediately preceding period of alternating electricity supplied to electrodes 30 and 32, the other pulse generating means is the first to operate during the next immediately adjacent period of alternating electricity.

Considering the conduction mode control means of FIG. 7 in more detail, it may be viewed as including the following elements. Flip-flop 560 may be viewed as first logic circuit means for providing output logic signals for controlling the operation of the first and second command pulse generating means. NOR gates 580 and 602 and the portion of the circuit of FIG. 7 providing input signals to these gates may be viewed as a source of timing pulses. NOR gates 568 and 592 may be viewed as gating means having inputs connected to the source of timing pulses and to the output of the first logic circuit means and having outputs connected in controlling relation to the first and second command pulse generating means. Flip-flop 700 and NAND gates 772, 728 and 736 may be viewed as second logic circuit means connected in controlled relation to the first logic circuit means and to the source of timing pulses and connected in controlling relation to the first logic circuit means for controlling the operation of the first and second command pulse generating means in an alternating manner.

By way of example, in an illustrative circuit, flip-flop 560 is type CD 4013AE, each of the resistors 564 and 574 has a magnitude of about 56 kilohms, resistor 586 has a magnitude of about 22.5 kilohms, resistor 598 has a magnitude of about 56 kilohms, and resistor 610 has a magnitude of about 5 kilohms. Transistors 622, 624 and 658, 660 are available commercially as a transistor switch combination designated CA 3046. Each of the resistors 634 and 672 has a magnitude of about 130 ohms, and each of the capacitors 638 and 676 has a magnitude of 0.1 microfarad and is rated at 12 volts d.c. Each of the light emitting diode and phototransistor combinations 636 and 674 is available commercially under the designation MCT 2. Both resistors 650 and 682 have magnitudes of about 1 megohm. Capacitor 694 has a magnitude of about 0.00047 microfarad, and each of the capacitors 696 and 698 has a magnitude of about 0.001 microfarad. Flip-flop 700 is type CD 4013 AE, capacitor 708 has a magnitude of about 10 microfarads and is rated at 10 volts d.c., resistor 714 has a magnitude of about 1 kilohm, capacitor 716 has a magnitude of about 0.001 microfarad, capacitor 764 has a magnitude of 0.1 microfarad and is rated at 12 volts d.c., and capacitor 768 has a magnitude of 0.05 microfarad.

The circuit of FIG. 7 also has the capability of supplying alternating electricity to the electrodes 30, 32 in a conventional manner wherein each period of alternating electricity begins with the same polarity as in the waveforms of FIG. 2. This is accomplished by moving switch arm 190 to a position engaging contact 192, with the result that flip-flop 700 and NAND gates 722, 728 and 736 are disconnected from the circuit. The output of NOR gate 602 or waveform G is applied to the clock input of flip-flop 560. The electricity supplied to the electrodes 30, 32 is controlled by the waveform A in the same manner as previously described.

It is therefore apparent that the present invention accomplishes its intended objects. The supply of electricity to an electrical glass melting furnace is controlled in a manner which eliminates or significantly minimizes any d.c. component in the electricity supplied to the electrodes. At the same time the supply of electricity also is controlled in accordance with actual and desired furnace operating conditions. The foregoing is accomplished in an efficient and effective manner. While a single embodiment of the present invention has been described in detail, this is done for the purpose of illustration, not limitation.

I claim;

1. In an electrical glass melting furnace including glass melting electrode means and means for supplying alternating electricity, a circuit for controlling the supply of said alternating electricity to said electrode means comprising:
   (a) circuit means for providing a conductive path between said supply means and said electrode means;
   (b) means in said path to selectively alter the electrical conduction of said path in a manner providing successive periods of alternating electricity each including a number of half cycles to said electrode means; and
   (c) control means connected in controlling relation to said conduction altering means for controlling the operation thereof, said control means causing one period of said alternating electricity supplied to said electrode means to begin with a polarity opposite that of the alternating electricity supplied during another immediately preceding period and causing adjacent periods of said alternating electricity to have the same number of half cycles, said control means comprising first pulse generating means for supplying command pulses to said conduction altering means for causing electrical conduction of one polarity in said path, second pulse generating means for supplying command pulses to said conduction altering means for causing electrical conduction of an opposite polarity in said path, and conduction mode control means for controlling the operation of said first and second pulse generating means in an alternating manner from period to period and in a manner such that adjacent periods include the same number of half cycles whereby whichever of said pulse generating means was the first to operate during the immediately preceding period of alternating electricity supplied to said electrode means the other pulse generating means is the first to operate during the next immediately adjacent period;
   (d) whereby any component of direct electricity in said path is cancelled to zero when averaged over said two of said adjacent periods having said same number of half cycles and any direct electricity in said path is eliminated or significantly minimized during operation of said furnace.

2. Apparatus according to claim 1, wherein said means to selectively alter the electrical conduction of said path comprises parallel connected, reverse-poled controlled rectifiers and wherein said command pulses are coupled to said rectifiers.

3. Apparatus according to claim 1, wherein said conduction mode control means comprises:
   (a) first logic circuit means for providing output logic signals for controlling the operation of said first and second pulse generating means;
   (b) a source of timing pulses;
   (c) gating means having inputs connected to said source of timing pulses and to the output of said first logic circuit means and having outputs connected in controlling relation to said first and second pulse generating means; and
   (d) second logic circuit means connected in controlled relation to said first logic circuit means and to said source of timing pulses and connected in controlling relation to said first logic circuit means for controlling the operation of said first and second pulse generating means in said alternating manner.

4. Apparatus according to claim 3 further including monitoring means responsive to an electrical condition in said conductive path and connected in controlling relation to said first logic circuit means.

5. Apparatus according to claim 4 wherein said monitoring means includes:
   (a) first comparison means for comparing the actual electrical current flowing in said conductive path between said supply means and said electrode means to a desired value of said current and providing an output indication of said comparison;
   (b) second comparison means for comparing the actual electrical power supplied to said electrode means to a desired value of said power and providing an output indication of said comparison; and
   (c) gating means connected to the outputs of said first and second comparison means and connected to said first logic circuit means, said gating means providing outputs as a function of relationships between said indications.

6. Apparatus according to claim 1, further including monitoring means responsive to an electrical condition in said conductive path and operatively connected to said control means.

7. Apparatus according to claim 6, wherein said monitoring means includes:
   (a) first comparison means for comparing the actual electrical current flowing in said conductive path between said supply means and said electrode means to a desired value of said current and providing an output indication of said comparison;
   (b) second comparison means for comparing the actual electrical power supplied to said electrode means to a desired value of said power and providing an output indication of said comparison; and
   (c) gating means connected to the outputs of said first and second comparison means and operatively connected to said control means, said gating means providing outputs as a function of relationships between said indications.

8. A method of controlling the supply of alternating electricity to the electrode means of an electrical glass melting furnace comprising the steps of;
   (a) providing a conductive path between a supply of alternating electricity and said electrode means;
   (b) selectively altering the electrical conduction of said path in accordance with a desired amount of flow of alternating electricity to said electrode means; and
   (c) controlling said step of selectively altering said electrical conduction in a manner causing one period of said alternating electricity supplied to said electrode means to begin with a polarity opposite that of the alternating electricity supplied during another immediately preceding period and in a manner causing adjacent periods of said alternating electricity to have the same number of half cycles, said step of controlling comprising the steps of generating first pulses for supplying commands to control said conduction altering for causing electrical conduction of one polarity in said path, generating second pulses for supplying commands to control said conduction altering for causing electrical conduction of an opposite polarity in said path, and controlling the generation of said first and second pulses in an alternating manner from period to period and in a manner such that adjacent periods include the same number of half cycles whereby whichever of said first or second pulses was the first to be generated during the immediately preceding period of alternating electricity supplied to said electrode means the other pulse is the first to be generated during the next immediately adjacent period;
   (d) whereby any component of direct electricity in said path is cancelled to zero when averaged over two of said adjacent periods having said same number of half cycles and any direct electricity in said path is eliminated or significantly minimized during operation of said furnace.

9. A method according to claim 8 further including the steps of:
   (a) comparing the actual electrical current flowing in said conductive path between said supply means and said electrode means to a desired value of said current and providing the result of said comparison;
   (b) comparing the actual electrical power supplied to said electrode means to a desired value of said power and providing the result of said comparison; and
   (c) utilizing the results of said comparison to control the selective altering of said electrical conduction of said path.

10. In an electrical glass melting furnace including glass melting electrode means and means for supplying alternating electricity, a circuit for controlling the supply of said alternating electricity to said electrode means comprising:
   (a) circuit means for providing a conductive path between said supply means and said electrode means;
   (b) means in said path to selectively alter the electrical conduction of said path in a manner providing successive periods of alternating electricity to said electrode means; and
   (c) control means connected in controlling relation to said conduction altering means for causing one period of said alternating electricity supplied to said electrode means to begin with a polarity opposite that of the alternating electricity supplied during another immediately preceding period, said control means comprising first pulse generating means for supplying command pulses to said conduction altering means for causing electrical conduction of one polarity in said path, second pulse generating means for supplying command pulses to said conduction altering means for causing electrical conduction of an opposite polarity in said path, and conduction mode control means for controlling the operation of said first and second pulse generating means in an alternating manner from period to period whereby whichever of said pulse generating means was the first to operate during the immediately preceding period of alternating electricity supplied to said electrode means the other pulse generating means is the first to operate during the next immediately adjacent period, said conduction mode control means comprising first flip-flop means having a conditional input, a clock input and a true output, said flip-flop being connected so that when a pulse is applied to the clock input thereof, the true output goes to the logical state of the conditional input, means for applying to said conditional input a pulse signal containing logical information as to the result of a comparison between the actual and desired condition of an electrical parameter of the electricity supplied to said electrode means, means for providing timing pulses including a first pulse train having constant frequency, pulse width and pulse interval and a second pulse train which is the inverse of said first pulse train, first NOR gate means having an output connected to said first pulse generating means and having one input connected to the true output of said first flip-flop means and another input connected to one of said pulse trains, second NOR gate means having an output connected to second pulse generating means and one input connected to the true output of said first flip-flop means and another input connected to the other of said pulse trains, second flip-flop means having a conditional input, a clock input, and true and complement outputs, said flip-flop means being connected so that when a pulse is applied to said clock input the complement output goes to the logical state of said conditional input, means for applying said first pulse train to the conditional input of said second flip-flop means, first NAND gate means having an output and having one input connected to said first pulse train and having another input connected to the complement output of said second flip-flop means, second NAND gate means having an output and having one input connected to the true output of said second flip-flop means and having another input connected to said second pulse train, and third NAND gate means having one input connected to said first NAND gate means and having another input connected to said second NAND gate means and having an output connected to the clock input of said first flip-flop means;

(d) whereby any component of direct electricity in said path is cancelled to zero when averaged over said one period and said immediately preceding period and any direct electricity in said path is eliminated or significantly minimized during operation of said furnace.

11. Apparatus according to claim 10, further including monitoring means responsive to an electrical condition in said conductive path and operatively connected to said conduction mode control means.

12. Apparatus according to claim 11, wherein said monitoring means includes:
(a) first comparison means for comparing the actual electrical current flowing in said conductive path between said supply means and said electrode means to a desired value of said current and providing an output indication of said comparison;
(b) second comparison means for comparing the actual electrical power supplied to said electrode means to a desired value of said power and providing an output indication of said comparison; and
(c) gating means connected to the outputs of said first and second comparison means and connected to said control means, said gating means providing outputs as a function of relationships between said indications.

* * * * *